United States Patent [19]
Pedersen et al.

[11] Patent Number: 5,165,496
[45] Date of Patent: Nov. 24, 1992

[54] FULLY HYDRAULIC STEERING ARRANGEMENT FOR VEHICLES

[75] Inventors: Poul H. H. Pedersen, Nordborg; Thorkild Christensen; Johannes V. Baatrup, both of Sonderborg; Svend E. Thomsen, Nordborg, all of Denmark

[73] Assignee: Danfoss A/S, Nordborg, Denmark

[21] Appl. No.: 723,780

[22] Filed: Jul. 1, 1991

[30] Foreign Application Priority Data

Aug. 8, 1990 [DE] Fed. Rep. of Germany ....... 4025113

[51] Int. Cl.$^5$ .............................................. B62D 5/06
[52] U.S. Cl. ...................................... 180/132; 91/44; 180/134
[58] Field of Search ............... 180/132, 134, 135, 158, 180/162; 91/41, 42, 43, 44, 45; 92/28

[56] References Cited

U.S. PATENT DOCUMENTS 4,558,759 12/1985 Baatrup et al. ..................... 180/132
4,771,846 9/1988 Venable et al. ..................... 180/142

Primary Examiner—David M. Mitchell
Assistant Examiner—Kevin Hurley
Attorney, Agent, or Firm—Wayne B. Easton

[57] ABSTRACT

A control valve is opened (moved from its neutral position) by rotation of a steering wheel to conduct fluid from a pump to a steering meter device that controls the amount of fluid fed to a steering motor arrangement. When the steering motor piston has been displaced by a distance corresponding to the angle of rotation of the steering wheel, the control valve is moved by the steering meter device from its opened condition to its neutral position. A pilot valve controlled actuating device is provided to short circuit the steering meter device to permit continued fluid flow from the pump to the steering motor device and provide a mechanical braking force to the meter device to block rotation thereof and thereby the movement of the control valve to its neutral position. The braking mechanism is resiliently urged to a non-braking position.

10 Claims, 3 Drawing Sheets

FULLY HYDRAULIC STEERING ARRANGEMENT FOR VEHICLES

The invention relates to a fully hydraulic steering arrangement for vehicles.

In a steering arrangement of this kind, a steering handwheel opens a steering valve in a control device, through which valve the hydraulic fluid is conveyed to a steering motor. The hydraulic fluid is also conveyed to a steering metering device, for example a metering motor or a metering pump, which closes the steering valve again when an amount of hydraulic fluid corresponding to the angle of rotation of the steering handwheel has flowed to the steering motor. A specific setting of the steering motor is thus associated with each position of the steering handwheel, the setting being determined by the amount of hydraulic fluid that has flowed to the steering motor. In order to lock the steered wheels completely, or, in the case of vehicles with articulation control, to allow the vehicle to articulate fully, several rotations of the steering handwheel are generally required. Despite the assistance afforded by the hydraulic system, this can represent considerable physical effort for the driver over a period of time, in particular when the vehicle has to be manoeuvred backwards and forwards or if frequent changes in direction have to be made, as can be the case, for example, with building site vehicles.

The invention is based on the problem of facilitating operation of the steering using simple means.

This problem is solved by a fully hydraulic steering arrangement for vehicles, having an hydraulic pump, which is connected to a control valve operable by a steering handwheel, a steering motor arrangement and a steering metering device which controls the amount of hydraulic fluid to be conveyed to the steering motor arrangement by the control valve, an actuating device being provided which, with the assistance of a brake device, arrests the steering metering device mechanically and with the assistance of a short-circuiting valve produces a short circuit for the hydraulic fluid by way of the steering metering device.

Because the brake device mechanically arrests the steering metering device, that is to say, the metering motor or the metering pump, it prevents the steering metering device being actuated by the hydraulic fluid. The steering metering device is then unable to close the control valve. On the other hand, the flow of the hydraulic fluid is not blocked since at the same time as the steering metering device is being arrested, a short-circuit route that by-passes the steering metering device is set up. The control valve, which can be actuated by the steering handwheel, remains in the hydraulic circuit between the pump and the steering motor arrangement. This control valve now acts as a simple proportional valve, so that the speed at which the steering motor arrangement is operated can be adjusted by operating the steering handwheel. As long as the steering handwheel remains rotated in one direction, the steering motor arrangement works until it engages a stop member, without the position of the steering motor arrangement being defined by the position of the steering handwheel. The steering handwheel has in this case assumed the character of the gear change lever or joystick. Simply by turning the steering handwheel by a few degrees, the driver is able to achieve full lock of the wheels or a full articulation of the vehicle, without having to expend a great deal of physical effort. Apart from a change-over switch, no additional operating elements are required in the cab of the vehicle. The driver is able to steer the vehicle using the steering handwheel normally used for steering. The features required to realise this function are restricted to a short-circuiting valve and a mechanical brake.

In a preferred construction, the actuating device is operable hydraulically by way of a pilot valve. The driver therefore needs to exert virtually no force himself to operate the brake. The braking, that is to say, arresting of the steering metering device, is assisted hydraulically.

In a preferred construction, the actuating device comprises a piston with a circumferential annular groove displaceable in a hollow cylinder, into which short-circuiting channels joined to the connecting channels for the steering metering device open; the piston covers the short-circuiting channels everywhere, in its brake end position it arrests the steering metering device and joins the short-circuiting channels with one another by way of the circumferential annular groove. The short-circuiting channels are covered over at all times by the piston. Provided that the annular groove is not in the region of the short-circuiting channels, the short-circuiting channels are separated from one another. No hydraulic fluid is able to pass from one short-circuiting channel to another. In this position the steering metering device is also still fully functional, so that the fully hydraulic steering arrangement functions normally, that is to say, the displacement of the steering motor is proportional to the rotation of the steering handwheel. The design of the piston, however, ensures that the short-circuiting channels are joined to one another exactly in the end position in which the steering metering device is arrested by the actuating device, that is to say, the piston.

It is then preferable for the piston to be constructed as a hollow piston, which is open at one end in the direction of the steering metering device and has a piston base, a brake piston that engages the piston base by way of a spring being guided in the hollow piston. On the side remote from the brake piston, the piston is subjected to pressure by the hydraulic fluid, and moves towards the steering metering device. The short-circuiting channels are short-circuited by the annular groove. The brake piston comes into contact with the steering metering device and arrests this. Provision can be made for the short-circuit to be produced shortly before the steering metering device is arrested. Upon a further increase in pressure, the spring between the piston and brake piston is compressed, until the piston and the brake piston come into contact with one another. From this point onwards, the full hydraulic pressure can be used to arrest the steering metering device.

It is then preferable for the brake device to be constructed as a friction brake. The steering metering device can thus be arrested in any position.

When the steering metering device has a star wheel and a distributor plate, it is advantageous for these two parts to be capable of being brought into frictional engagement with one another with the aid of the piston. The arresting of the steering metering device is thus effected in that the star wheel and the distributor plate are unable to rotate relative to one another.

In a further preferred construction, the piston is connected to the steering metering device such that they rotate together, the piston being arranged to be fixed in the hollow cylinder so that it does not rotate by a displacement in the axial direction. Provided that the piston has not been moved into its brake end position and has short-circuited the short-circuiting channels, it is freely rotatable in the cylinder. In its end position, however, a rotation of the piston is prevented, whereby a rotation also of the steering metering device is prevented. The piston can, for example, be connected to the star wheel so that they rotate together.

At its end facing the steering metering device, the hollow cylinder advantageously has projections on which the piston can be positioned by means of recesses on its corresponding end. In this manner, by an axial displacement the piston can be released or arrested in the direction of rotation. It is then preferable for the short projections to be constructed as an internal toothed configuration and for the recesses to be constructed as an a external toothed configuration. With a suitably small spacing between the teeth, the steering metering device can be fixed in a plurality of defined angular positions.

The invention is described hereinafter with reference to preferred embodiments in conjunction with the drawing, in which.

Figure 1:
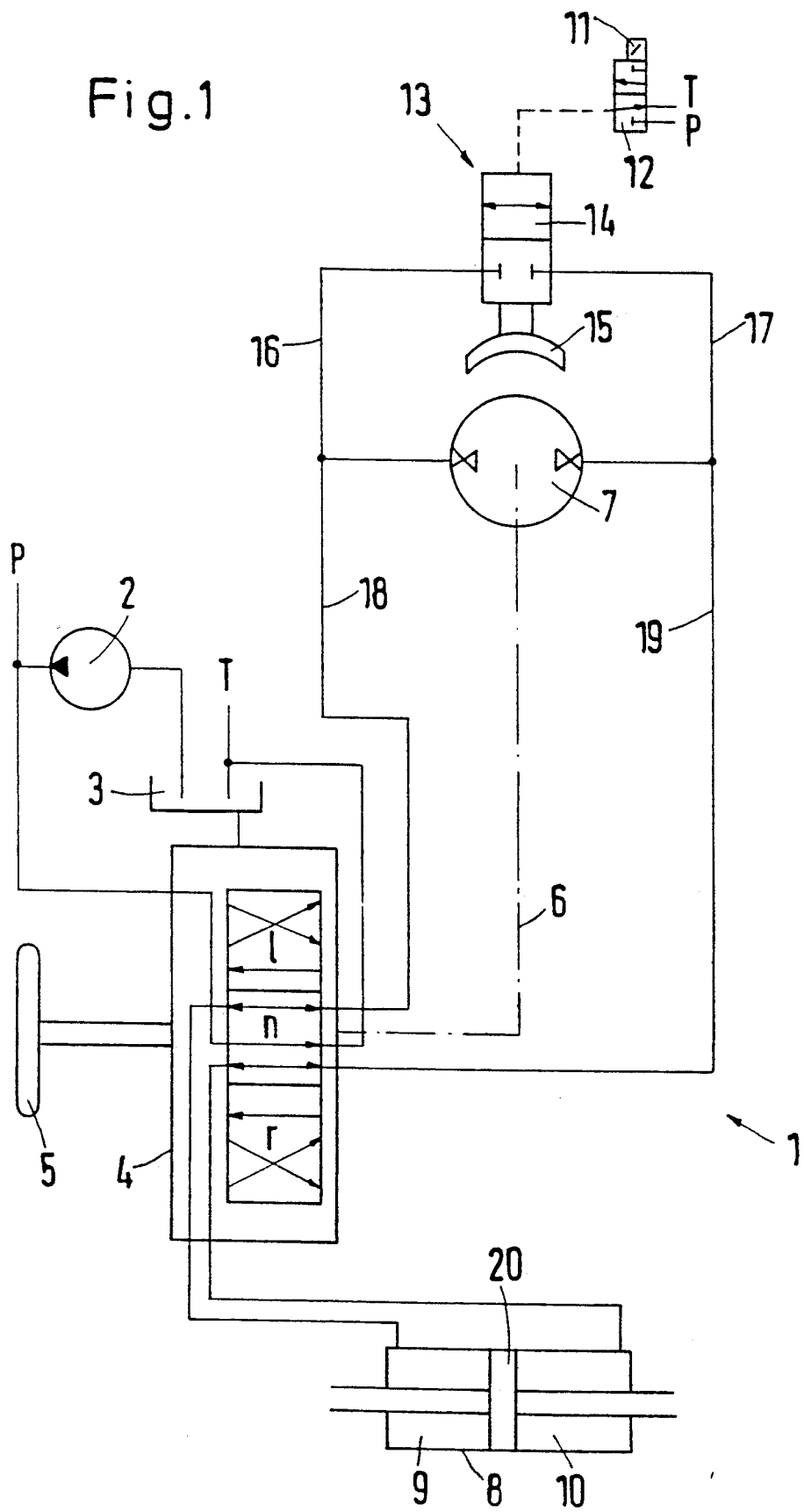
FIG. 1 is a diagram showing the principle of the steering arrangement.

A fully hydraulic steering arrangement 1 has a pump 2, which draws hydraulic fluid from a tank 3 and conveys it to a control valve 4, which is operable by a steering handwheel 5. The steering handwheel is connected to a steering shaft 6 which not only actuates the control valve 4, but also has arranged on it a steering metering device constructed as a metering motor 7. The steering metering device can also take the form of a metering pump. The control valve 4 is also connected to a steering motor 8. The steering motor 8 has two work chambers 9 and 10 and an intermediate steering piston 20. By pressurization of one or other of the work chambers 9, 10, the steering piston 20, together with steering gear, not shown in detail, is displaced in one or other direction.

In the neutral position n illustrated, the hydraulic fluid flows from the pump 2 through the control valve 4 directly back to the tank 3. The two work chambers 9, 10 of the steering motor 8 are connected to one another by way of the metering motor 7. If the control valve 4 is moved into the position 1 by the steering handwheel 5, hydraulic fluid flows from the pump 2 through a line 18 to the metering motor 7 and from there through a line 19 back to the control valve 4, from where it passes into the work chamber 10 of the steering motor 8. The steering piston 20 of the steering motor 8 is then displaced to the left. The hydraulic fluid displaced from the work chamber 9 passes through the control valve 4 back to the tank 3. The metering motor 7, which is driven by the hydraulic fluid, closes the control valve 4 when a predetermined amount of hydraulic fluid, defined by the rotation, that is, the angle of rotation, of the steering handwheel 5, has flowed into the steering motor 8. When the steering piston 20 has been displaced by a distance corresponding to the angle of rotation of the steering handwheel 5, the control valve 4 is again in its neutral position. Each angular position of the steering handwheel 5 therefore has a position of the steering piston 20 associated with it. When the driver wishes to obtain full lock of the wheels of his vehicle, or, in the case of a vehicle with articulation control, a full articulation of the vehicle, he needs to turn the steering handwheel through a corresponding angle of rotation, that is to say, in some circumstances several rotations of the steering handwheel 5 are required.

To facilitate actuation, an actuating device 13 is provided; it can be operated by a pilot valve 12 operable with the assistance of a switch 11. On being actuated by the pilot valve 12, with the assistance of a short-circuiting valve 14 the actuating device 13 short-circuits the hydraulic circuit through the metering motor 7 and arrests the metering motor 7 with the assistance of a brake device 15. In order to be able to make the short circuit, the hydraulic lines 18, 19 are connected to short-circuit lines 16, 17 which can be connected to one another by the short-circuiting valve 14. The pilot valve is connected with its connection P to the output of the pump 2 and at its connection T to a tank inlet.

Figure 2:
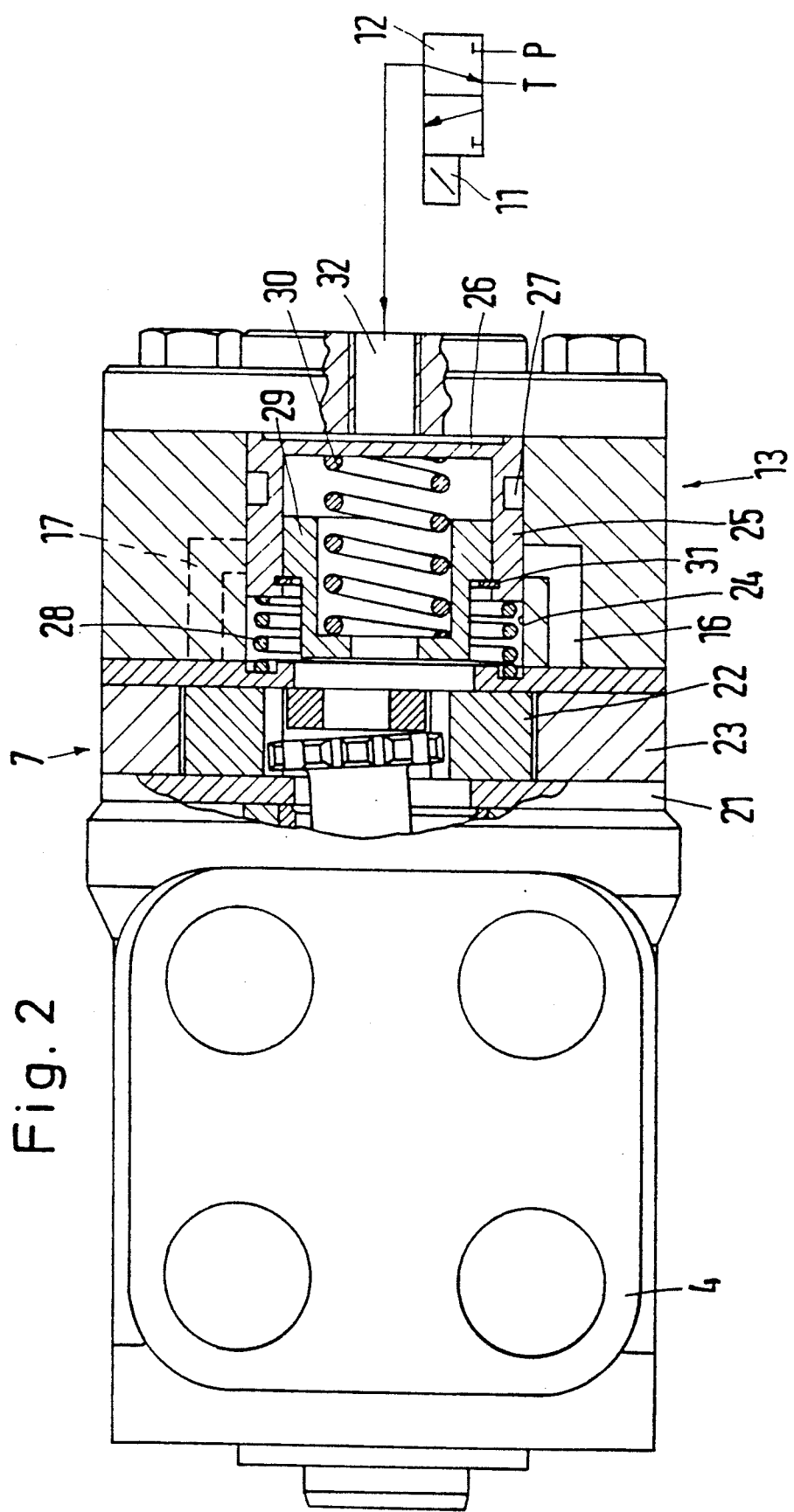
FIG. 2 shows a first constructional form of the brake and short-circuiting valve and FIG. 3 shows a second constructional form of the brake and short-circuiting valve.

FIG. 2 shows a first constructional form of the actuating device. The metering motor 7 has a distributor plate 21 and a star wheel 22 which orbits in an external wheel 23. The actuating device 13 comprises a hollow cylinder 24, in which a hollow piston 25, which is open at one end in the direction towards the metering motor 7 and has a piston base 26 at the opposing end, is axially displaceable. The hollow piston 25 has an annular groove 27. In the hollow cylinder 24, there is arranged a restoring spring 28 against which the hollow piston 25 can be displaced. In the hollow piston 25 there is arranged a brake piston 29 which is pressed in the direction of the metering motor 7 by a spring 30 bearing on the piston base 26. The brake piston 29 is fixed in the hollow piston 25 with the assistance of a spring ring 31, but is axially displaceable into the hollow piston 25 against the force of the spring 30. The hollow cylinder 24 can be supplied with hydraulic fluid by way of a connection 32, which is connected to the pilot valve. When the pilot valve produces a connection between the connection 32 and the pump 2, the hollow piston 25 is moved against the force of the spring 28 in the direction of the metering motor 7. As this piston moves, the annular groove 27 provides a short-circuit between the short-circuiting channels 16, 17. The brake piston 29 then comes into contact with the star wheel 22 of the metering motor 7. The hollow piston 25 continues to move and comes finally into contact with the brake piston 29, which it presses onto the star wheel 22 with the full hydraulic pressure. The star wheel 22 is thus pressed against the distributor plate 21 so that the metering motor is then arrested by frictional engagement. In this brake end position, the short-circuiting channels 16, 17 are completely short-circuited by the annular groove 27.

Figure 3:
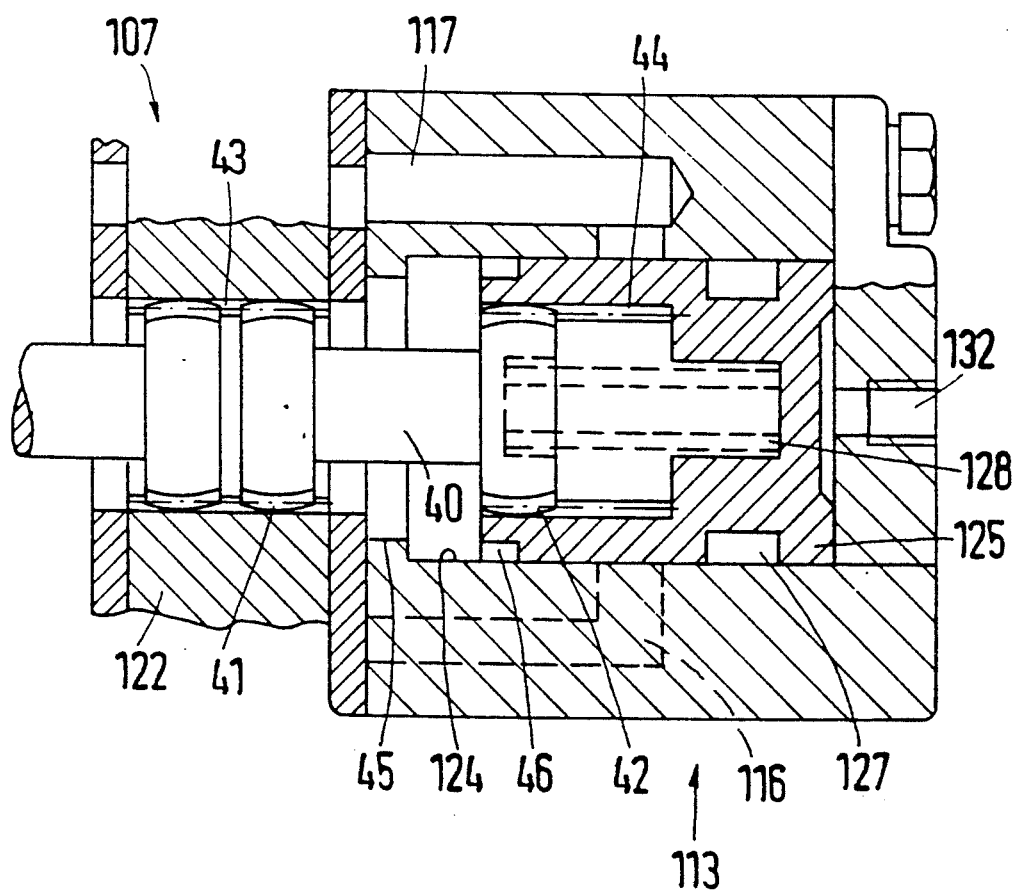

In the case of steering arrangements with greater displacement, instances may occur in which the frictional engagement is inadequate. Torques which are greater than the braking torque generated by the frictional engagement may occur. For such cases, a further embodiment of the actuating device is shown in FIG. 3. Components that correspond to those in FIG. 2 have been provided with reference numbers increased by 100. The hollow piston 125 is mounted so as to be axially displaceable in the hollow cylinder 124 against the force of the spring 128. The displacement can be effected by supplying hydraulic fluid through the connection 132. The hollow piston 125 is also rotatable in the hollow cylinder 124. The hollow cylinder 124 is connected to a shaft 40 so that they rotate together, the shaft being connected to the star wheel 122 so that they too rotate together. For that purpose, the shaft may have at both ends, for example, an external toothed configuration 41, 42, which meshes with a corresponding internal toothed configuration of the hollow cylinder 125 and star wheel 122 respectively. The internal toothed configuration in the hollow cylinder 125 has a length such that the hollow cylinder 125 is displaceable on the shaft 40 by a predetermined distance. At its end facing the metering motor 107, the hollow cylinder has an internal toothed configuration or projections 45. The hollow piston 125 has at its corresponding end, on the outside, an external toothing or recesses 46. When the hollow piston 125 is displaced in the direction of the metering motor 107, the internal toothed configuration or projections 45 mesh with the external toothing or recesses 46. The hollow piston 125 is then no longer rotatable in the hollow cylinder 124, but is fixed in the rotation direction with respect to the hollow cylinder 124 and thus with respect to the housing. At the same time, however, the star wheel 122 which is mounted so that it does not rotate relative to the hollow piston 125, is fixed in the direction of rotation. When the hollow piston 125 has been displaced sufficiently far for the internal toothed configuration 45 and the external toothed configuration 46 to engage with one another, the annular groove 127 has also produced a short-circuit between the short-circuiting channels 116, 117.

We claim:

1. A vehicle steering arrangement comprising a hydraulic pump, a sump, a rotatable steering wheel, a steering motor arrangement, a rotatable steering metering device for controlling the amount of fluid fed to the steering motor arrangement, a control valve connected between the steering wheel and the metering device that is openable by rotation of the steering wheel and closeable by the subsequent rotation of the metering device after stoppage of the steering wheel rotation, fluid circuit means fluidly connecting the control valve between the pump and the steering motor arrangement via the steering metering device to effect conducting the fluid from the pump to the metering device and then from the metering device to the steering motor arrangement, the steering metering device including movable means for closing the control valve when the amount of hydraulic fluid corresponding to the angle of rotation of the steering wheel has flown through the circuit means to the steering motor arrangement by the way of flow from the control valve and back through the valve to the steering motor arrangement, and manually operable actuating means for preventing operation of the steering metering device from being effective to close the control valve, the actuating means including operable brake means to mechanically arrest the movable means and form an open fluid flow path short circuiting the steering metering device to allow further rotation of the steering wheel and thereby allow a further flow of hydraulic fluid to the steering motor arrangement to permit a further steering control capability thereof.

2. A steering arrangement according to claim 1, characterized in that the actuating means is operable to an actuated condition to block operation of the steering metering device and that there is provided pilot valve means for operating the actuating means to its actuated condition.

3. A steering arrangement according to claim 1, characterized in that the brake means includes a hollow cylinder, a first piston displaceable within the hollow cylinder and having a circumferential annular groove that opens to the hollow cylinder, and first and second short circuiting channels for connecting the annular groove in parallel to the steering metering device, the piston being displaceable from a datum position that at least one of the fluid channels is out of fluid communication with the annular groove and a brake end position that both of the short circuiting channels open to the groove in circumferential spaced relationship to one another when the brake means mechanically arrests the movable means.

4. A steering arrangement according to claim 3, characterized in that the steering metering device and the first piston are rotatable when the piston is in its datum position and have cooperating means fixing them in the same angular relationship in each of the datum and the brake end positions of the first piston.

5. A steering arrangement according to claim 3, characterized in that the hollow cylinder has an open end facing the steering metering device, that the first piston is rotatable in the cylinder when the first piston is in its datum position and that the cylinder has projections and the piston has recesses into which the cylinder projections extend to block rotation of the piston relative to the hollow cylinder when the first piston is in its brake end position.

6. A steering arrangement according to claim 5, characterized in that cylinder projections are of internal toothed configurations and the first piston recesses are of an external toothed configuration.

7. A steering arrangement according to claim 3, characterized in that the first piston is hollow and has one end opening toward the movable means and a piston base and that the brake means includes a brake piston extending within the first piston for limited movement relative to the first piston in a direction toward the movable means and a spring interposed between the piston base and the brake piston for urging the brake piston toward the movable means.

8. A steering arrangement according to claim 7, characterized in that the brake means comprises a friction brake.

9. A steering arrangement according to claim 7, characterized in that the steering metering device includes a distribution plate, that the movable means includes an orbital star wheel, and that the first piston in moving toward the star wheel exerts a force through the brake piston for moving the star wheel relative to the distribution plate to frictionally engage one another.

10. A vehicle steering arrangement of the type having a steering wheel and a fluid operated steering motor having operating ports, metering means, control valve means having a first part connected to and moveable by said steering wheel and a second cooperable part connected to and rotatable with said metering means, first fluid supply and return paths between said control valve means and said steering motor and second fluid supply and return paths between said control valve means and said metering means, said vehicle steering arrangement being characterized by (1) a short circuit fluid path to effect bypassing of said metering means relative to said control valve means and (2) brake means for immobilizing said metering means to prevent closing of said control valve means, and manually controllable actuating means to establish said short circuit fluid path and to actuate said brake means to effect the direct control of said fluid operated steering motor via said control valve means and said short circuit fluid path.

* * * * *